SUPERREGENERATIVE DETECTOR
Filed Oct. 4, 1956
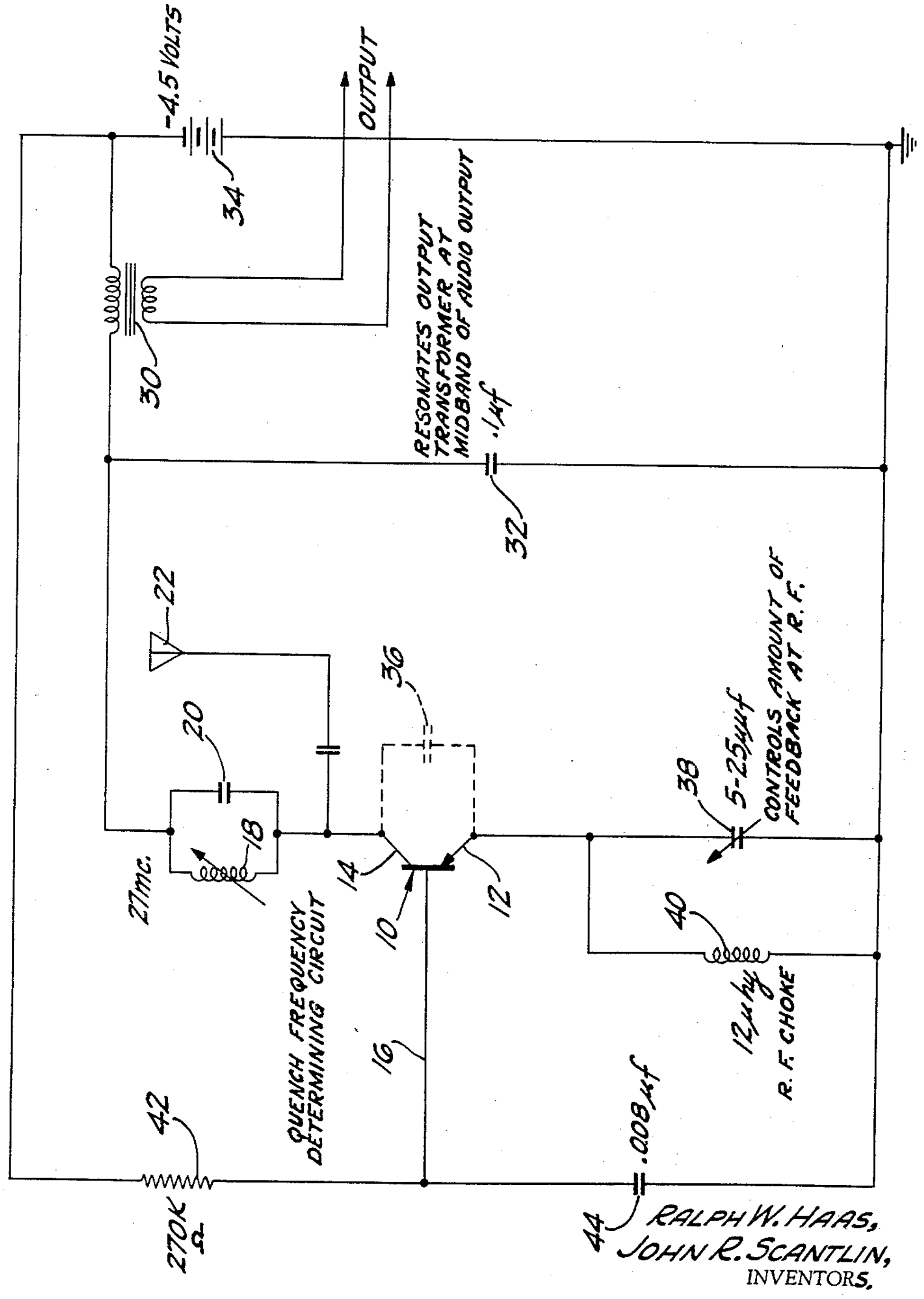
RALPH W. HAAS,
JOHN R. SCANTLIN,
INVENTORS.
BY T. L. Bowes
ATTORNEY.

United States Patent Office 2,922,032

Patented Jan. 19, 1960

2,922,032

SUPERREGENERATIVE DETECTOR

Ralph W. Haas and John R. Scantlin, Los Angeles, Calif., assignors to General Dynamics Corporation, Rochester, N.Y., a corporation of Delaware Application October 4, 1956, Serial No. 613,914

1 Claim. (Cl. 250—20)

This invention relates to superregenerative transistor detectors and, more particularly, to improvements therein.

A superregenerative detector circuit is a well-known arrangement for its sensitivity in receiving and detecting amplitude-modulated radio waves. Since the transistor lends itself to the manufacture of making small, compact, and light weight receivers, it is only natural that attempts should be made to develop a superregenerative detector circuit employing transistors. One approach to this may be found described in an article by W. F. Chow, in the IRE Transactions for March 1956, on page 58, which is entitled Transistor Superregenerative Detection. The general approach with a transistor superregenerative detector circuit is to use the same circuit arrangement as is employed with vacuum tubes. However, the circuit which results does not have a satisfactorily controllable quench frequency nor a sufficient frequency range.

An object of the present invention is to provide a superregenerative detector circuit for a transistor wherein the quench frequency is readily controllable.

Another object of the present invention is to provide a superregenerative detector circuit wherein the bandwidth may be readily controlled.

Yet another object of the present invention is to provide a novel, superregenerative detector circuit.

Another object of the present invention is to provide a superregenerative detector circuit having simple and novel means for accommodating variations in transistor parameters.

Still another object of the present invention is to provide a simple and useful superregenerative detector circuit.

These and other objects of the present invention are achieved in an arrangement whereby advantage is taken of the capacitance established between the input and output electrodes, or emitter and collector of a transistor upon the application of the operating bias thereto. Therefore, there is a certain amount of regenerative feedback between these two electrodes. By controlling the amount of this regenerative feedback, the detector circuit may be made to oscillate without any difficulty at a frequency selected by a tuned circuit which is in the collector electrode. An output circuit is also connected to the collector electrode circuit. The quench frequency of the superregenerative oscillator may be readily controlled by the values selected for a condenser and a resistor having one of their ends connected to the base electrode and the other of their ends respectively connected to opposite sides of a source of operating bias. If desired, the output circuit may be tuned by a condenser which is connected between the outputs of circuit and ground.

The novel features that are considered characteristic of this invention are set forth with particularity in the appended claim. The invention itself, both as to its organization and method of operation, as well as additional objects and advantages thereof, will best be understood from the following description when read in connection with the accompanying drawing, which is a circuit diagram of an embodiment of the invention.

Reference is now made to the drawing showing a circuit diagram of an embodiment of the invention. In the drawing, the transistor includes a semiconductor body, an emitter electrode 12, a collector electrode 14, and a base electrode 16, all in contact therewith. In the conventional symbols shown, the emitter is indicated by the arrow, and the direction of positive emitter current flow is indicated by the direction of the arrow. Thus, where emitter current flows out of the body toward the emitter, an n-p-n junction transistor is represented by a smybol in which the emitter arrow points away from the base. On the other hand, where emitter current flows into the body from the emitter, the junction transistor of the p-n-p type is represented by a symbol in which the emitter arrow points toward the base. For convenience, the conventional transistor symbol used in the drawing has the emitter arrow pointing toward the base and the battery polarity is chosen for the indicated direction of the emitter current flow. This invention, however, is not to be limited to any particular type of transistor. For emitter current flow in the opposite direction, the battery polarity is reversed from that shown.

The collector has in series therewith a frequency-determining circuit for the oscillator which comprises the inductor 18 which is in parallel with the condenser 20. Introduction of a signal into the circuit may be made by any well-known means, either directly by radiation to the inductor 18 or from an antenna 22 through any suitable coupling arrangement to the inductor 18. Tuning may be accomplished, if desired, in the well-known manner by varying the inductance of inductor 18 or condenser 20. An output circuit is also connected in circuit with the collector 14. This comprises an output transformer 30 which has its primary connected between the oscillation-determining circuit and the battery. A condenser 32 is connected between the primary of this transformer and the other side of the battery 34. It assists in tuning the primary of the transformer to the midpoint of the band of audio frequencies to be detected by the circuit, and also bypasses RF frequencies to ground.

When a bias is applied across the junction of the transistor a capacitance relationship exists between the emitter and collector electrode. This is explained on page 10 of section 1.3.3 of the book Principles of Transistor Circuits, by R. F. Shea, published by John Wiley & Sons, Inc., in 1953. Thus, a certain amount of in-phase, or regenerative, signal is fed back between the collector and the emitter via this collector-emitter capacitance 36, represented by dotted lines and shown connected between the collector and the emitter. The amount of signal which is fed back is controlled by a variable condenser 38, which is connected between the emitter and other side of the battery 34. This condenser, together with the collector-emitter capacitance, constitutes a capacitive voltage divider whereby the amount of the voltage which the emitter receives from the collector via the collector-emitter capacitance may be controlled by selecting the value of the capacitor 38. Thus, this is made to be a variable capacitor whose value may be varied to establish the maximum superregenerative gain. The value selected is determined by the parameters of the transistor, such as the collector-emitter capacitance.

In order to provide a low-resistance direct-current return path for the emitter and at the same time preserve a high-impedance alternating-current path across the capacitor 38, an inductor 40 is connected across the capacitor. This inductor is selected to have a low inter-winding capicitance in order to minimize its effect upon the value of the capacitor 38 connected in parallel therewith.

Control of the quench frequency of the superregenerative detector is readily established by the value selected for the resistor 42, which is connected between the base electrode and one side of the battery 34, and for the condenser 44, which is connected between the base electrode and the other side of the battery 34. Due to the finite input and output impedances of a transistor, the values selected for other circuit components, to a certain extent, will also determine the quench frequency—especially the value of condenser 38. However, for any selected values of these other components, the range and therefore the value of the quench frequency may be said to be controlled by the values selected for condenser 44 and resistor 42, since these have the greatest control effect.

This circuit will oscillate at a freqency substantially established by the resonance frequency of the inductance 18 and the capacitance 20. A certain amount of the voltage developed across this tank circuit is fed back to the emitter electrode via the collector-emitter capacitance 36. The amount of this voltage is determined by the value selected for the condenser 38. As soon as the circuit oscillates, condenser 44 charges up by reason of the rectifying action provided between the emitter and base electrode. When the charge thereon attains a sufficiently high value, the oscillation is stopped by reason of the back bias applied from the condenser 44 to the base electrode. The condenser then proceeds to lose its charge through the resistor 42. This reduces the bias upon the base electrode, whereupon the circuit again may commence to oscillate. Thus, the quench frequency is determined by the time required for the condenser 44 to charge up and then discharge through the resistor 42. The point at which oscillation commences again depends upon the strength of the radio-frequency signal being received. This, in turn, depends upon its amplitude modulation.

By way of illustration and not to be construed as a limitation, suitable values for the resistors and condensers are shown in the drawing for an embodiment of the invention which was built to oscillate at a frequency of 27 megacycles and to be quenched at a frequency of 4000 cycles. The tank circuit comprising the inductance 18 and the capacitance 20 may be tuned by using either a powdered iron slug in the coil or a trimmer capacitor in parallel with the condenser 20, or both. As stated above, the point at which oscillation commences in the circuit shown, after it has been cut off by reason of the building up of the charge across condenser 44, depends upon the strength of the external radio-frequency signal being received. Variations in the external field strength will therefore determine the quench frequency rate at which the RF oscillations build up and decay. The total collector current is logarithmically proportional to the external field strength, and if the external radio-frequency signal is varied at an audio rate, then the result obtained in the output transformer will be audio-frequency variations of the collector current. The primary of the transformer 30 and the condenser 32 may be selected to form a tuned circuit approximately in the center of the range of audio frequencies desired to thereby assist in developing a voltage proportional to the audio frequency current. Quench frequencies as low as 2 kc. and as high as 70 kc. may be obtained by varying the value of condenser 44. For best results, the quench frequency must be selected to be at least ten times the highest audio frequency to be detected, if attenuation of the audio signal is to be avoided.

There has accordingly been described and shown herein a novel, useful, simple, and inexpensive superregenerative detector circuit employing a transistor.

We claim:

A superregenerative detector circuit comprising a transistor having a semiconductor body, a base electrode, a collector electrode, and an emitter electrode, means for applying operating potential to said electrodes, an output transformer, a parallel tuned circuit for determining oscillation frequency connected between said output transformer and said collector electrode, means to control feedback between said collector and emitter electrodes including a first capacitor connected to said emitter electrode, and an inductor connected in parallel with said first capacitor, means to control the quench frequency of said detector including a resistor connected between said means for applying operating potential and said base electrode, and a second capacitor connected between said base electrode and said means for applying operating potential, and a third capacitor connected between said output transformer and said means for applying operating potential and having its value selected to form a tuned circuit with said transformer within the range of the output frequencies desired.

References Cited in the file of this patent

UNITED STATES PATENTS

| | | |
|---|---|---|
| 2,550,518 | Barney | Apr. 24, 1951 |
| 2,742,571 | Herzog | Apr. 17, 1956 |
| 2,751,497 | Duncan | June 19, 1956 |
| 2,760,070 | Keonjian | Aug. 21, 1956 |
| 2,789,214 | Seargeant | Apr. 16, 1957 |
| 2,836,724 | Kaminow | May 27, 1958 |

OTHER REFERENCES

Hughes: Superregenerative transistor receiver, Radio & Television News, March 1954, pages 72, 73, 91.

Radio & Television News, March 1954, pp. 72, 73, 91, "Vacuum Tube Oscillators," by Edson, 1953 (John Wiley & Sons, New York), chapter 10, p. 227.